SIGNAL PROCESSOR FOR GENERATING AND ANALYZING SPECTRAL INFORMATION

Filed Oct. 26, 1967 4 Sheets-Sheet 1

INVENTOR.
FERDINAND R. OHNSORG
BY Bruce C. Lutz
ATTORNEY

INVENTOR.
FERDINAND R. OHNSORG
BY Bruce C Lutz
ATTORNEY

INVENTOR.
FERDINAND R. OHNSORG
BY Bruce C Lutz
ATTORNEY

INVENTOR.
FERDINAND R. OHNSORG

BY Bruce C Lutz

ATTORNEY

United States Patent Office 3,553,723

Patented Jan. 5, 1971

3,553,723

SIGNAL PROCESSOR FOR GENERATING AND ANALYZING SPECTRAL INFORMATION

Ferdinand R. Ohmsorg, St. Paul, Minn., assignor to Honeywell Inc., Minneapolis, Minn., a corporation of Delaware

Filed Oct. 26, 1967, Ser. No. 678,282

Int. Cl. G06g *7/00;* G01j *3/00*

U.S. Cl. 235—181 14 Claims

ABSTRACT OF THE DISCLOSURE

A signal processor using square waves or Walsh functions to extract spectral information from an input signal is shown. The spectral information or spectral components are used to classify the input signal in one of a number of classes.

SUMMARY OF THE INVENTION

This invention pertains to signal processing and signal classification apparatus. More specifically the invention pertains to a signal processor and classifier which uses square wave Walsh functions to analyze an input signal.

Signal processing and classification can be used in a variety of systems such as in pattern recognition where an input signal is classified into one of a set of classes or in intrusion detection systems where the presence of a person or vehicle is to be detected. This invention will be described in reference to an intrusion detection system, but it is to be understood that the invention can be utilized in any one of a number of systems where an input signal is to be analyzed or processed and classified.

Prior art intrusion detection systems have been designed for such uses as where it is desired to determine the presence of persons or vehicles in specific or given area. However, prior art systems generate a high rate of false alarms because they are often triggered by vegetation or animals. This invention provides an intrusion detection system which is much more accurate than prior art systems, but is yet reasonable as to size and cost.

The essence of this invention is in processing the input signal by the use of square wave Walsh functions to extract spectral information from the input signal. Walsh functions are defined on the interval from 0 to T by the following set of equations where $\phi_n^{(k)}$ represents the Walsh function components.

$$\phi_0^{(t)}=1 \text{ for } 0\leq t\leq T \tag{1}$$

$$\phi_1^{(t)}=\begin{cases}1 \text{ for } 0\leq t<\frac{T}{2}\\ -1 \text{ for } \frac{T}{2}<t\leq T\end{cases} \tag{2}$$

$$\phi_2^{(1)}(t)=\begin{cases}1 \text{ for } 0\leq t<\frac{T}{4};\ \frac{3T}{4}<t\leq T\\ -1 \text{ for } \frac{T}{4}<t<\frac{3T}{4}\end{cases} \tag{3}$$

$$\phi_2^{(1)}(t)=\begin{cases}1 \text{ for } 0\leq t<\frac{T}{4};\ \frac{T}{2}<t<\frac{3T}{4}\\ -1 \text{ for } \frac{T}{4}<t<\frac{T}{2};\ \frac{3T}{4}<t\leq T\end{cases} \tag{4}$$

$$\phi_{n+1}^{(2k-1)}(t)=\begin{cases}\phi_n^{(k)}(2t) \text{ for } 0\leq t<\frac{T}{2}\\ (-1)^{k+1}\phi_n^{(k)}(2t-1) \text{ for } \frac{T}{2}<t\leq T\end{cases} \tag{5}$$

$$\phi_{n+1}^{(2k)}(t)=\begin{cases}\phi_n^{(k)}(2t) \text{ for } 0\leq t<\frac{T}{2}\\ (-1)^{k}\phi_n^{(k)}(2t-1) \text{ for } \frac{T}{2}<t\leq T\end{cases} \tag{6}$$

$k=1, 2, 3 \ldots 2^{n-1}$; $n=1, 2, 3 \ldots$.

Formulas 1–4 provide the first four Walsh functions while Equations 5 and 6 define the higher order Walsh function harmonics. These Walsh functions were first described in an article by J. L. Walsh, "A Closed Set of Normal Orthogonal Functions," American Journal of Mathematics, vol. 45, January 1923, pp. 5–25. Walsh functions resemble Fourier sinusoids of a Fourier series representation since they are orthogonal on the interval 0 to T, are uniformly bounded, have the same number of zero crossings, and are even or odd. In addition Walsh and others have developed theorems for Walsh functions which correspond to those developed for the Fourier series representation. The most significant difference, however, is that Walsh functions take on only the values +1 and −1 while the Fourier series representation involves sinusoids. Thus, Walsh functions are much easier to work with and process since switching circuitry can be used to generate the functions rather than the far more complex circuitry which is necessary to generate Fourier functions.

The input signal which is to be processed and classified may be derived from any suitable sensor which generates a signal in response to excitation by a target, such as an optical sensor, a sensor which senses movement or vibration, a Geophone, or radar. The input signal contains information concerning the type of target which was sensed. A set of Walsh functions are generated in a function generator. Each of the Walsh functions is multiplied times the input signal to form a set of functions of the form $$Y(t)=\phi_n^{(k)}f(t) \tag{7}$$

where $f(t)$ is the input signal. Next, the signals represented by the functions of Equation 7 are integrated to form the set of functions $$F_i=\int_0^T \phi_n^{(k)}f(t)\,dt \tag{8}$$

Next, the integral is squared to form what is defined as a Walsh spectral component $$F_i^2=\left[\int_0^T \phi_n^{(k)}f(t)\,dt\right]^2 \tag{9}$$

These spectral components are combined to form a Walsh line spectrum, which is defined hereinafter. The spectral components and the line spectrum are then examined or analyzed to determine which class the input signal falls into.

Accordingly, it is an object of this invention to provide new and novel signal processing and classification apparatus.

Another object of this invention is to provide new and novel signal processing and classification apparatus wherein square wave Walsh functions are used to analyze the signal.

Other object and advantages of this invention will become evident to those skilled in the art upon a reading of this specification and the appended claims in conjunction with the drawings, of which:

FIGURE 1

Figure 1:
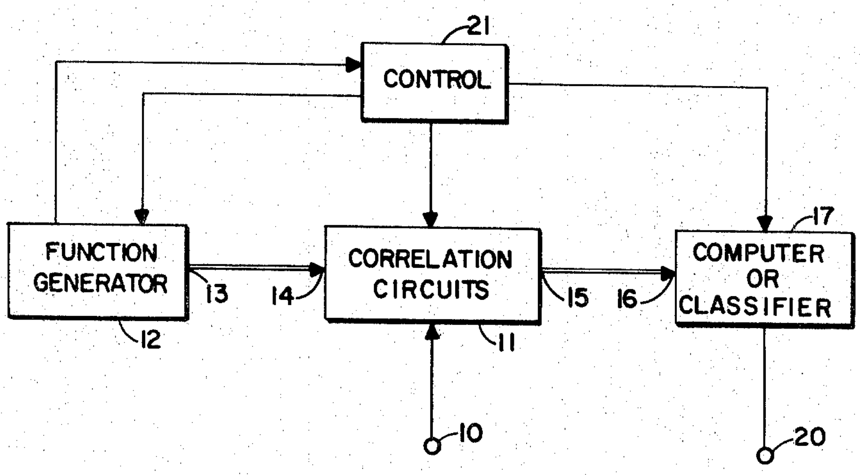
FIG. 1 is a block diagram of the invention.

FIG. 1 shows the general scheme of the invention. An input means or terminal 10 provides an input signal which is coupled to a block 11 labeled correlation circuits. A block 12 labeled function generator has a set of outputs 13 connected to a set of inputs 14 of correlation circuits 11. Correlation circuits 11 have a set of outputs 15 connected to a set of inputs 16 of a block 17 labeled computer or classifier. Block 17 is connected to an output means or terminal 20. Function generator 12, correlation circuits 11, and classifier 17 operate under the control of a block 21 labeled control. Control 21 is connected to each of the other blocks 11, 12, and 17. Control 21 provides timing signals and switching signals.

FIGURES 2 AND 3

Figure 2:
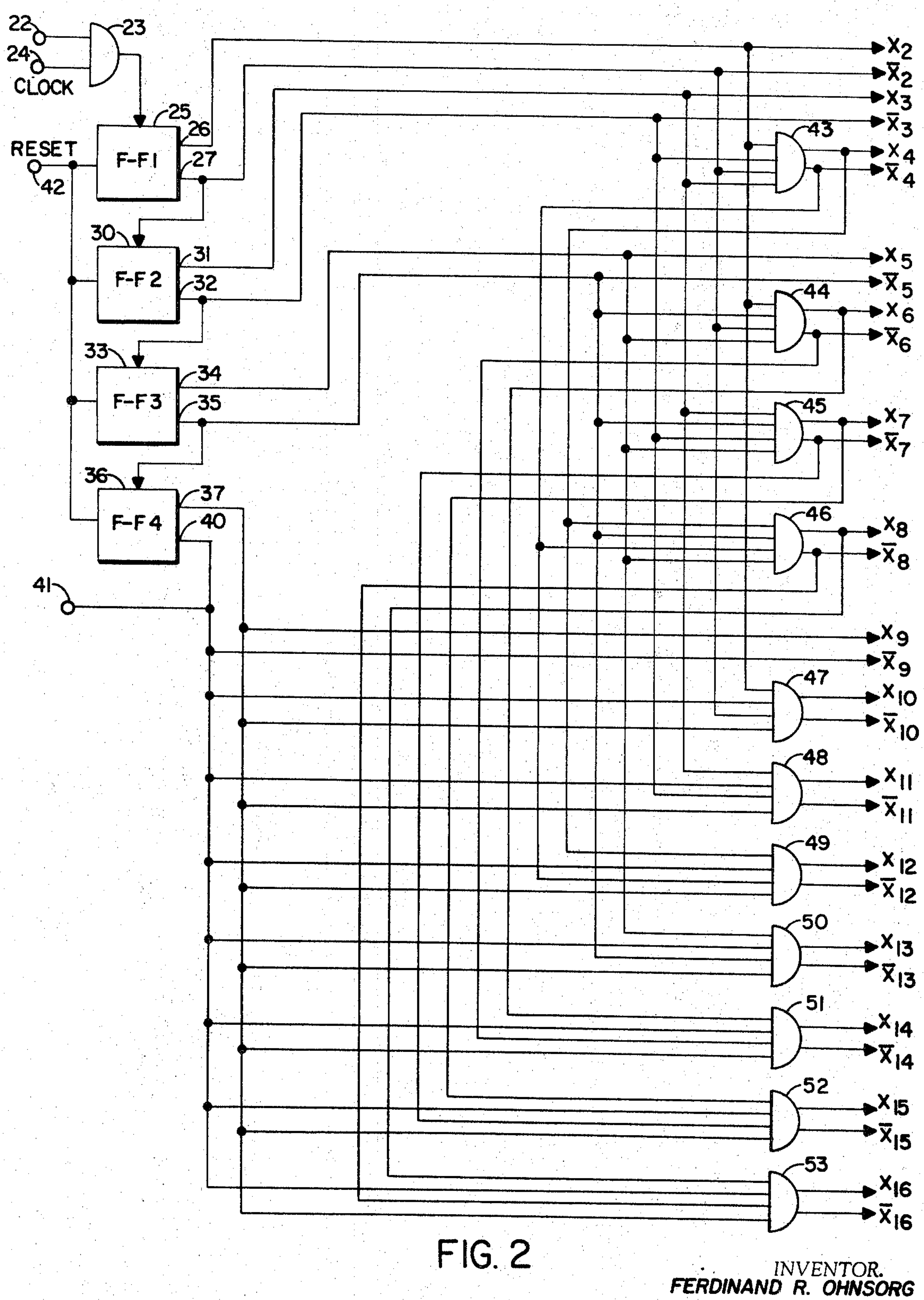
FIG. 2 is a schematic diagram of a Walsh function generator.

FIG. 2 is a schematic diagram of a signal generating means, function generator, or circuit for generating signals representative of Walsh functions. Thus, FIG. 2 is illustrative of a circuit which can be used in block 12 of FIG. 1. In FIG. 2 a terminal 22 is connected to one input of AND gate 23. A terminal 24 labeled clock is connected to a second input of AND gate 23 which has an output connected to a triggering input of a first counter stage or flip-flop 25 which is labeled F–F 1. Flip-flop 25 has a first output 26 and a second output 27. Outputs 26 and 27 are logical inverses of each other. Output 27 of flip-flop 25 is connected to a trigger input of a second counter stage or flip-flop 30 which is labeled F–F 2. Fip-flop 30 has a first output 31 and a second output 32 which are logical inverses of each other. Output 32 of flip-flop 30 is connected to a triggering input of a third counter stage or flip-flop 33 which is labeled F–F 3. Flip-flop 33 has a first output 34 and a second output 35 which are logical inverses of each other. Output 35 of flip-flop 33 is connected to a triggering input of a fourth counter stage or flip-flop 36 which is labeled F–F 4. Flip-flop 36 has a first output 37 and a second output 40 which are logical inverses in each other. Output 40 of flip-flop 36 is connected to a terminal 41. A reset input terminal 42 is connected to a reset input of each of flip-flops 25, 30, 33, and 36.

The circuit of FIG. 2 provides a set of outputs $X_2$ through $X_{16}$ and the logical inverse of each output. The $X_2$ output signal is provided by output 26 of flip-flop 25 and its logical inverse $\overline{X}_2$ is provided by output 27 of flip-flop 25. Output signal $X_3$ is provided by output 31 of flip-flop 30 and output signal $\overline{X}_3$ is provided by output 32 of flip-flop 30. Outputs 26 and 27 of flip-flop 25 and outputs 31 and 32 of flip-flop 30 are connected to first, second, third, and fourth inputs of a gate 43. Gate 43 provides an $X_4$ output signal and its logical inverse $\overline{X}_4$. An $X_5$ output signal is provided by output 34 of flip-flop 33 and output 35 of flip-flop 33 provides an output signal $\overline{X}_5$. Outputs 26 and 27 of flip-flop 25 and outputs 34 and 35 of flip-flop 33 are connected to first, second, third, and fourth inputs of a gate 44 which provides an $X_6$ output signal and its logical inverse $\overline{X}_6$. Outputs 31 and 32 of flip-flop 30 and outputs 34 and 35 of flip-flop 33 are connected to first, second, third, and fourth inputs of a gate 45 which provides an output signal $X_7$ and its logical inverse $\overline{X}_7$. Outputs 34 and 35 of flip-flop 33 and and the outputs of gate 43 are connected to first, second, third, and fourth inputs of a gate 46 which provides an $X_8$ output signal and its logical inverse $\overline{X}_8$. An $X_9$ output signal is provided by output 37 of flip-flop 36 and output 40 provides a $\overline{X}_9$ output signal. Outputs 26 and 27 of flip-flop 25 and outputs 37 and 40 of flip-flop 36 are connected to first, second, third, and fourth inputs of a gate 47 which provides an output signal $X_{10}$ and its logical inverse $\overline{X}_{10}$. Outputs 31 and 32 of flip-flop 30 and outputs 37 and 40 of flip-flop 36 are connected to first, second, third, and fourth inputs of a gate 48 which provides an output signal $X_{11}$ and its logical inverse $\overline{X}_{11}$. The outputs of gate 43 and outputs 37 and 40 of flip-flop 36 are connected to first, second, third, and fourth inputs of a gate 49 which provides an output signal $X_{12}$ and its logical inverse $\overline{X}_{12}$. Outputs 34 and 35 of flip-flop 33 and outputs 37 and 40 of flip-flop 36 are connected to first, second, third, and fourth inputs of a gate 50 which provides an output signal $X_{13}$ and its logical inverse $\overline{X}_{13}$. The outputs of gate 44 and outputs 37 and 40 of flip-flop 36 are connected to first, second, third, and fourth inputs of a gate 51 which provides an output signal $X_{14}$ and its logical inverse $\overline{X}_{14}$. The outputs of gate 45 and outputs 37 and 40 of flip-flop 36 are connected to first, second, third, and fourth inputs of a gate 52 which provides an output signal $X_{15}$ and its logical inverse $\overline{X}_{15}$. The outputs of gate 46 and outputs 37 and 40 of flip-flop 36 are connected to first, second, third, and fourth inputs of a gate 53 which provides an output signal $X_{16}$ and its logical inverse $\overline{X}_{16}$.

The logic performed by gates 43–53 is given in the following list of equations.

$$X_4=(X_2+\overline{X}_3)\cdot(\overline{X}_2+X_3) \quad (10)$$

$$X_6=(X_2+\overline{X}_5)\cdot(\overline{X}_2+X_5) \quad (11)$$

$$X_7=(X_3+\overline{X}_5)\cdot(\overline{X}_3+X_5) \quad (12)$$

$$X_8=(X_4+\overline{X}_5)\cdot(\overline{X}_4+X_5) \quad (13)$$

$$X_{10}=(X_2+\overline{X}_9)\cdot(\overline{X}_2+X_9) \quad (14)$$

$$X_{11}=(X_3+\overline{X}_9)\cdot(\overline{X}_3+X_9) \quad (15)$$

$$X_{12}=(X_4+\overline{X}_9)\cdot(\overline{X}_4+X_9) \quad (16)$$

$$X_{13}=(X_5+\overline{X}_9)\cdot(\overline{X}_5+X_9) \quad (17)$$

$$X_{14}=(X_6+\overline{X}_9)\cdot(\overline{X}_6+X_9) \quad (18)$$

$$X_{15}=(X_7+\overline{X}_9)\cdot(\overline{X}_7+X_9) \quad (19)$$

$$X_{16}=(X_8+\overline{X}_9)\cdot(\overline{X}_8+X_9) \quad (20)$$

To perform the logic functions given by Equations 10–20 half-adders or similar gating circuits such as exclusive OR gates can be used for gates 43–53. Such circuits are commercially available.

Figure 3:
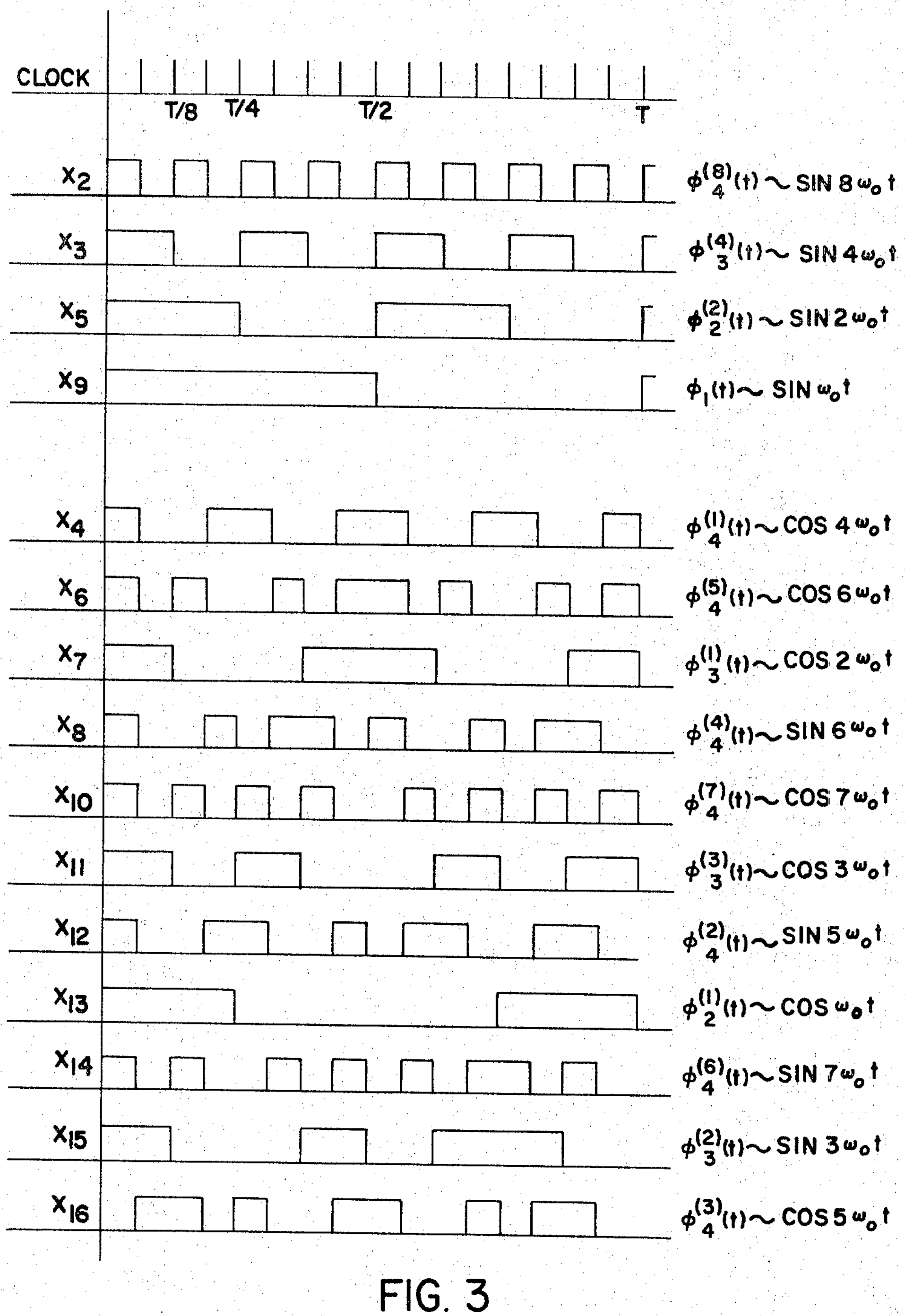
FIG. 3 is a logic and timing diagram to aid in explaining FIG. 2.

FIG. 3 is a logic and timing diagram which illustrates the operation of FIG. 2. At the start of a cycle of operation, control 21 of FIG. 1 provides a signal at terminal 22 which enables AND gate 23 to couple the clock pulses present at terminal 24 to the input of flip-flop 25. These clock pulses illustrated in FIG. 3 on the graph labeled CLOCK. Flip-flops 25, 30, 33 and 36 operate as a four-stage ripple counter to provide the $X_2$, $X_3$, $X_5$, and $X_9$ output signals or their logical inverses. The remaining output signals $X_4$, $X_6$–$X_8$, and $X_{10}$–$X_{16}$ are illustrated in FIG. 3. The output signal from output 40 of flip-flop 36 is connected to terminal 41 which is in turn connected to control 21. When the output signal at terminal 41 goes from a "1" level to a "0" level, control 21 generates an output signal which is coupled to terminal 22 which causes AND gate 23 to inhibit the clock pulses present at terminal 24. Thus, one cycle of operation is defined as one cycle of the counter. If necessary, reset signals can be applied at terminal 42 to insure that all of the flip-flops start counting from the proper states.

The start of a cycle of operation is controlled by control 21. Control 21 can be organized such that each cycle of operation starts at predetermined intervals. Alternatively, control 21 can be designed so that it receives the input signal applied at terminal 10. In actual practice the second alternative was used and the input signal was applied to a threshold detector contained in control 21 so that a cycle of operation was started when the input signal exceeded a predetermined threshold. Thus, when the sensor which provides the input signal to terminal 10 is not activated by any stimuli, the system is inactive. When the sensor is activated by an object which is to be detected and classified, control 21 provides an output signal to start a cycle of operation. When the second alternative is used, the circuitry does not operate except when there is an indication that a signal is present thereby conserving power.

On the right-hand edge of FIG. 3 the Walsh functions to which the $X_i$ correspond are given. The logic "1" corresponds to a +1 of the Walsh function and a logic "0" corresponds to a −1 of the Walsh function. Since the inverse $\overline{X}_i$ of each $X_i$ signal is also generated by the circuit of FIG. 2, when $X_i$ is "1" it corresponds to a +1 of the Walsh function and when $\overline{X}_i$ is "1" it corresponds to a −1 of the Walsh function. $\phi_0(t)$ is not given in FIGS. 2 and 3 since this Walsh function is always a +1 and a DC voltage signal corresponds to $\phi_0(t)$. As was mentioned above, there is a correspondence between Walsh functions and Fourier sinusoids. The respective Fourier sinusoid representation is given adjacent to the Walsh function to which it corresponds.

It should be noted that the circuitry of FIG. 2 produces signals corresponding to Walsh functions through $n=3$ of Equations 5 and 6. The circuitry of FIG. 2 can be extended to produce signals corresponding to higher order Walsh functions in accordance with the general Equations 5 and 6.

FIGURE 4

Figure 4:
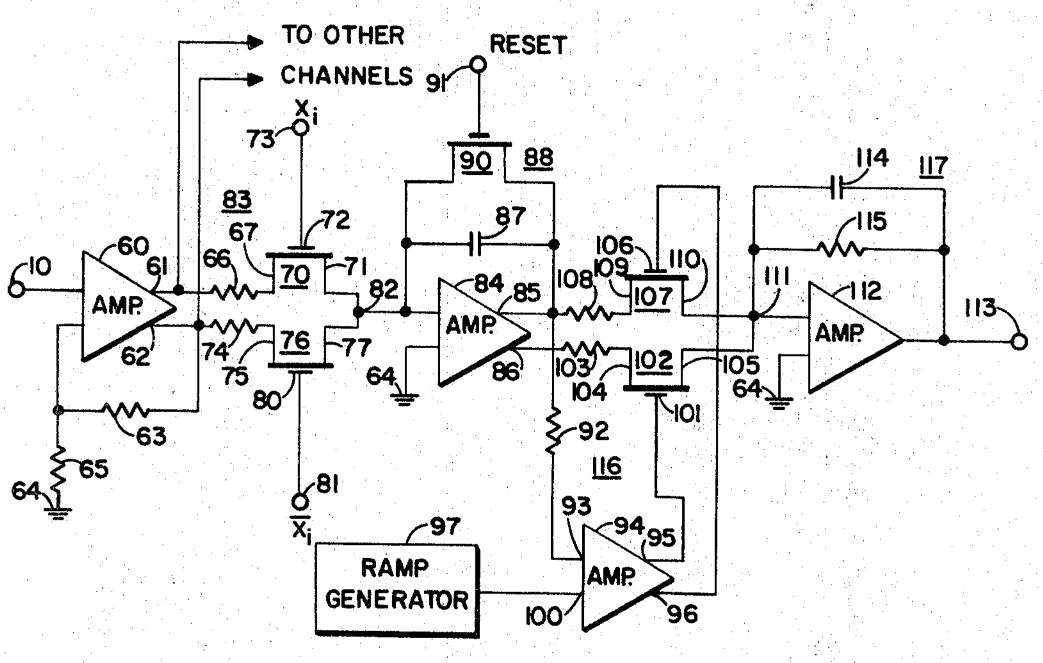
FIG. 4 is a schematic diagram of a portion of FIG. 1.

In FIG. 4 there is shown one circuit of a set of circuits which can be incorporated into the correlation circuits of block 11 in FIG. 1. Input terminal 10 is connected to a first input of an amplifier 60 which has a first output 61 and a second output 62. Output 62 is connected by means of a resistor 63 to the second input of amplifier 60. The second input of amplifier 60 is connected to ground 64 by means of a resistor 65. Resistors 63 and 65 provide feedback. Output 61 is connected by means of a resistor 66 to a source 67 of an FET transistor 70. Transistor 70 has a drain 71 and an insulated gate 72. A terminal 73 labeled $X_i$ is connected to gate 72. Output 62 of amplifier 60 is connected by means of a resistor 74 to a source 75 of an FET transistor 76 which has a drain 77 and an insulated gate 80. A terminal 81 labeled $\overline{X}_i$ is connected to gate 80. Drains 71 and 77 are connected together at a junction point 82. Transistors 70 and 76 together with their associated connections comprise a gating means or a multiplying means 83.

Junction point 82 is connected to a first input of an amplifier 84 which has an output 85 and an output 86. Output 85 is connected by means of a capacitor 87 to junction point 82. Capacitor 87 provides integrating feedback around amplifier 84 to convert amplifier 84 into an integrating means or integrator 88. A second input terminal of amplifier 84 is connected to ground 64. An FET transistor 90 is connected across capacitor 87 so that when transistor 90 is switched ON, it shorts capacitor 87. A terminal 91 is connected to an insulating gate of transistor 90.

Output 85 of amplifier 84 is connected by means of a resistor 92 to an input 93 of an amplifier 94 which has outputs 95 and 96. A ramp generator 97 is connected to a second input terminal 100 of amplifier 94. Ramp generator 97 and amplifier 94 are a simple pulse width modulator since the output signal from amplifier 94 is of one polarity until the signal from ramp generator 97 exceeds the signal from integrator 88 and the output signal from amplifier 94 changes polarity. Output 95 is connected to an insulated gate 101 of an FET transistor 102. Output 86 of amplifier 84 is connected by means of a resistor 103 to a source 104 of transistor 102. Transistor 102 further has a drain 105. Output 96 of amplifier 94 is connected to an insulated gate 106 of an FET transistor 107. Output 85 of amplifier 84 is connected by means of resistor 108 to a source 109 of transistor 107. Transistor 107 further has a drain 110. Drains 105 and 110 are connected together at a junction point 111. Junction point 111 is connected to an input of an amplifier 112 which has an output connected to an output terminal 113. The output of amplifier 112 is connected to junction point 111 by means of a parallel combination of a capacitor 114 and a resistor 115. A second input of amplifier 112 is connected to ground 64. Transistors 102 and 107 together with amplifier 94 and their associated circuitry and connections comprise a squaring means, a squaring circuit, or a multiplying means 116. Amplifier 112 and its associated circuitry operate as an operational amplifier 117.

Westinghouse WS306 integrated amplifiers can be used for amplifiers 60, 84, 94, and 112. In a practical embodiment of this invention transistors 70, 76, 90, 102, and 107 were the same type as are used in a Fairchild M34000 5 channel switch.

Correlation circuits 11 of FIG. 1 contain one amplifier corresponding to amplifier 60 and contain one multiplier, one integrator, and one squaring circuit for each of the pair of $X_i$ outputs of FIG. 2. Thus, outputs 61 and 62 of amplifier 60 are connected to each channel so that the input signal is multiplied by each $X_i$. Each of the circuits corresponding to FIG. 4 of correlation circuits 11 provides one spectral component at output terminals 15 of correlation circuits 11. Output terminal 113 of FIG. 4 corresponds to one of output treminals 15. The first Walsh component $\phi_0(t)$ is a +1 on the interval 0–T. A +1 multiplied times the input signal is the input signal so that the first or zeroth order spectral component can be obtained by merely integrating the input signal and squaring the integral. The remaining channels provide output signals in accordance with Equations 7–9.

The input signal is received at input terminal 10. Amplifier 60 provides an output signal identical to the input signal at output 61 and provides an output signal at output 62 which is the inverse of the input signal, i.e., the input signal multiplied by −1. The input signal is multiplied by the Walsh function in multiplier 83 in accordance with Equation 7. The multiplication is performed by gating the input signal, that is $X_i$ and $\overline{X}_i$ signals switch transistors 70 and 76 ON to couple the input signal or its inverse to junction point 82. Amplifier 84 and its associated circuitry integrates the signal at terminal 82 in accordance with Equation 8. Amplifier 84 provides an output signal at output 85 corresponding to the integral and provides the inverse of the integral at output 86. Ramp generator 97 and amplifier 94 pulse width modulate the output signal from the integrator. This pulse width modulated signal appears at output 95 of amplifier 94 and its inverse appears at output 96. The pulse width modulated signal is used to gate the output signals of the integrator by switching transistors 102 and 107. Thus, the output of transistors 102 and 107 is a pulse width-pulse heighth modulated signal which is proportional to the square of the integral. This signal is the $F_i^2$ signal corresponding to Equation 9. The $F_i^2$ signal is smoothed by operational amplifier 117 and is provided as the output signal at output terminal 113.

At the start of each cycle of operation control 21 of FIG. 1 provides a signal at terminal 91 which switches transistor 90 OFF thereby permitting amplifier 84 and capacitor 87 to integrate. At the end of a cycle of operation after the output signal has been read, control 21 provides a signal at terminal 91 which switches transistor 90 ON to discharge capacitor 87 and prepare the integrator for another cycle of operation. Note that there will be one spectral component $F_i^2$ for each of the $X_i$ signals from FIG. 2, including $X_1$. These signals are the Walsh spectral components.

Referring back to FIG. 1, the Walsh spectral components are applied to input terminal 16 of computer or classifier 17. The spectral information contained in the Walsh spectral components is extracted by classifier 17 and the input signal is classified in one of a plurality of classes. For example, in an intrusion detection system it may be desired to classify the input signal as class 1 (noise), class 2 (people), or class 3 (vehicles) each class of signals will have different spectral components. Thus, by inspecting the spectral components and especially the magnitude of each spectral component, the intruder or thing which activated the sensor can be determined.

FIGURE 5

Figure 5:
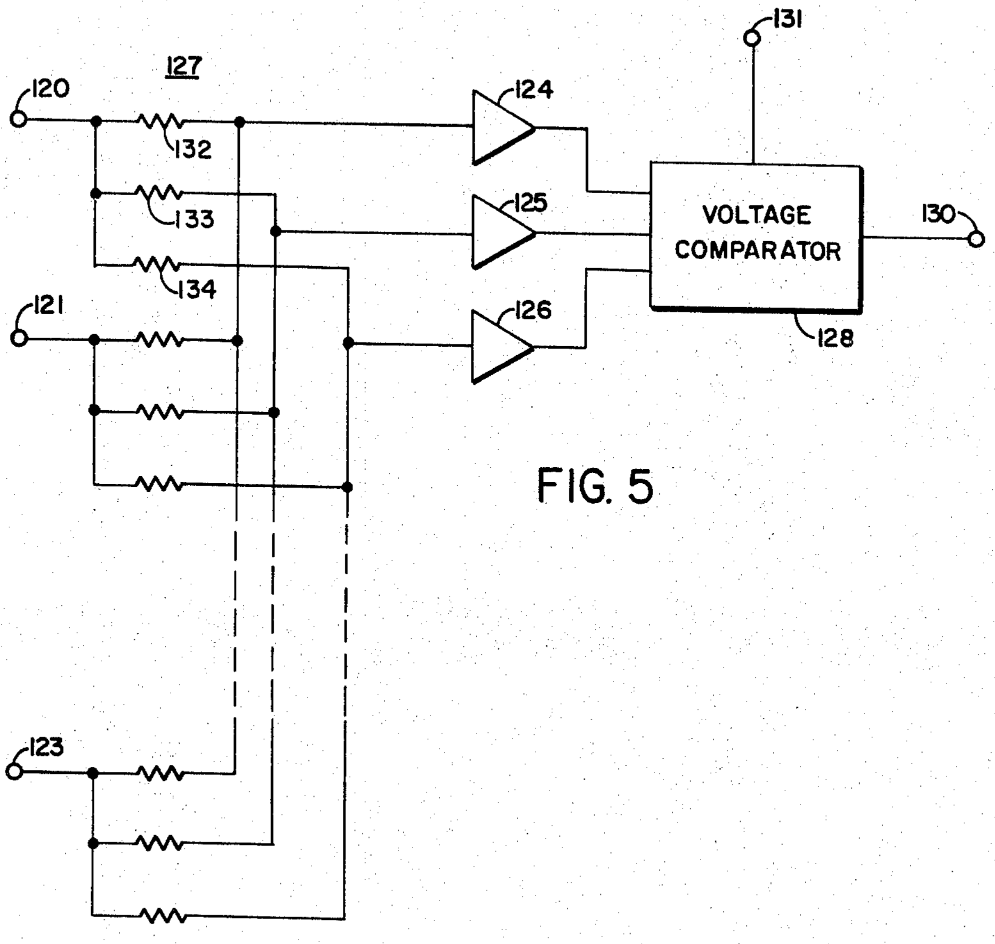
FIG. 5 is a schematic and block diagram of another portion of FIG. 1.

A circuit for classifying the input signal is shown in FIG. 5. In FIG. 5 a set of input terminals 120, 121, and 123 are shown connected to a set of summing amplifiers 124, 125, 126 by a set of summing resistors or summers 127. For example, input terminal 120 is connected to summing amplifier 124 by means of a resistor 132, to summing amplifier 145 by means of a resistor 133, and to summing amplifier 126 by means of a resistor 134. Generally, there is one input terminal for each of the 16 outputs from the correlation circuits of FIG. 4. Generally, also each input terminal is connected to each of the summing amplifiers by means of summing resistors 127.

The outputs of amplifiers 124, 125, and 126 are connected to inputs of a voltage comparator 128. Voltage comparator 128 provides an output signal to an output terminal 130. A terminal 131 is connected to voltage comparator 128. Terminal 131 is also connected to control 21 of FIG. 1 which provides appropriate clock signals to enable comparator 128 so that the comparison is made at the completion of a cycle of operation.

Each output terminal equivalent to terminal 113 of FIG. 4 and output 15 of correlation circuits 11 of FIG. 1 is connected to one of the input terminals of FIG. 5. Thus, summing resistors 127 sum each of the $F_i^2$ spectral components. The weights of the resistors in summing resistors 127 are selected such that the magnitude of the output signals from amplifiers 124–126 is indicative of the target or stimuli which activated the sensor. Voltage comparator 128 compares the magnitudes of the output voltages from amplifiers 124–126 and the results of the comparison are provided by a signal at output terminal 130 (which is equivalent to output terminal 20 of FIG. 1). The signal provided at terminal 130 may be a coded signal or separate signals may be provided at separate terminals in which case more than one output terminal would be used depending upon the number of classes.

At this point the Walsh line spectrum will be defined. The Walsh line spectrum is defined by the following equations where $P_i$ are the lines of the spectrum.

$$P_0=F_1^2 \qquad (21)$$

$$P_m=\sum_{i=1+2^{m-1}}^{2^m} F_i^2 \qquad (22)$$

$m=1, 2 \ldots k$.

Equations 21 and 22 can be derived mathematically; however, the derivation is quite complex and involves the use of the matrix notation. Accordingly, the derivation of Equations 21 and 22 will not be given in the specification. The definition of a Walsh line spectrum is a consequence of the orthonomality of the Walsh functions. The Walsh line spectrum is somewhat analogous to a Fourier line spectrum, and like the Fourier line spectrum it is phase invariant. That is, the line spectrum is independent of the phase of the input signal.

The following equations give the $P_m$ lines of the line spectrum for Walsh functions.

$$P_0=F_1^2 \qquad (23)$$

$$P_1=F_2^2 \qquad (24)$$

$$P_2=F_3^2+F_4^2 \qquad (25)$$

$$P_3=F_5^2+F_6^2+F_7^2+F_8^2 \qquad (26)$$

$$P_4=F_9^2+F_{10}^2+F_{11}^2+F_{12}^2+F_{13}^2+F_{14}^2+F_{15}^2+F_{16}^2 \qquad (27)$$

Equations 23–27 are inherently incorporated into summing resistors 127; however, the $P_m$ spectrum lines are not present at any specific point in the circuitry of FIG. 5. Equations 23–27 are used to calculate the resistor values for summing resistors 127.

The $P_m$ lines of the line spectrum are summed by summing resistors 127. The summing resistors are weighted so that certain lines predominate in forming the sum. For example, assume that the $P_0$ line is relatively large when the sensor is activated by a vehicle but is small when the sensor is activated by a person or noise. The summing resistor that couples the $F_1^2$ signal to amplifier 126 (assuming that amplifier 126 corresponds to vehicles) is weighted to give the $F_1^2$ signal a large weight because the signal is indicative of a vehicle. However, the $F_1^2$ signal is given a small weight by the resistors coupling it to amplifiers 124 and 125 (which correspond to noise and people, respectively). Similarly, the $P_1$, $P_2$, $P_3$, and $P_4$ lines are weighted and summed with the $P_0$ line with large weights being given to those lines which are good indicators of the objects which activated the sensor.

The output resultant signals from amplifiers 124 and 126 are compared by voltage comparator 128. Comparator 128 provides an output signal indicative of the largest of the three input signals. If the output signal from amplifier 124 is largest, comparator 128 provides an output signal which indicates that noise activated the sensor and the input signal is classified as noise. Similarly, if the output signal from amplifier 125 is largest, comparator 128 provides an output signal which indicates that a person activated the sensor. If the output signal from amplifier 126 is largest, comparator 128 provides an output signal which indicates that a vehicle activated the sensor.

The weights of the resistors can be determined by calculations from sample $P_m$ lines obtained from representative signals. For example, a digital computer can be programmed to calculate the best fit or best resistor weights by using the following procedure:

(a) Calculate sample spectral components from sample input signals;

(b) Sort or examine the spectral components and line spectrum to determine which lines contain information that contributes to classifying the input signals;

(c) Calculate the resistor values which will give relatively greater weight to the more significant lines of the spectrum; and (d) Adjust the resistor values by an integration process until the best "decision boundary" is determined. This procedure is essentially the same as the procedure used for pattern recognition training.

While I have described one embodiment of my invention, many modifications will be evident to those skilled in the art. For example, the number of Walsh signals that can be used is not limited to sixteen and the number of classes that the input signal can be classified into is not limited to three. These and many other modifications can be made within the scope of my invention.

I claim as my invention:

1. Apparatus of the class described comprising, in combination:

signal generating means for generating signals representative of Walsh functions;

means for providing an input signal;

means, connected to said means for providing an input signal and to said signal generating means, for providing output signals representative of the square of the integral of said signals representative of Walsh functions multiplied by said input signal; and output means, connected to said means for providing output signals, for receiving said output signals.

2. Apparatus as defined in claim 1 wherein said signal generating means includes counter means and gating means connected to said counter means and to said means for providing output signals.

3. Apparatus as defined in claim 1 wherein said means for providing output signals includes gating means connected to said signal generating means and to said means for providing an input signal, said signals from said signal generating means operating said gating means to enable said gating means;

integrating means connected to said gating means for receiving signals from said gating means; and squaring means connected to said integrating means and to said output means.

4. Apparatus as defined in claim 3 wherein said signal generating means includes counter means and second gating means connected to said counter means and to said means for providing output signals.

5. Signal processing apparatus comprising, in combination:

signal generating means for generating a set of signals representative of Walsh functions;

means for providing an input signal;

means for computing spectral components including a set of computing means;

means connecting said means for computing spectral components to said means for providing an input signal and to said signal generating means whereby each of said computing means receives one signal of said set of signals representative of Walsh functions, each of said computing means providing one spectral component signal corresponding to the signal connected thereto; and output means connected to said means for computing spectral components for receiving the spectral component signals.

6. Signal processing apparatus as defined in claim 5 wherein said signal generating means includes counter means and gating means connected to said counter means and to said means for computing spectral components whereby output signals from said counter means and said gating means are representative of Walsh functions.

7. Signal processing apparatus as defined in claim 5 wherein said computing means include multiplying means connected to said means for providing an input signal and said signal generating means, said multiplying means providing output signals representative of said input signal multiplied by said signals representative of Walsh functions;

integrating means connected to said multiplying means for integrating the output signals therefrom; and squaring means connected to said integrating means for providing the spectral component signals.

8. Signal processing apparatus as defined in claim 7 wherein said output means includes a plurality of summing means for summing the spectral component signals; said summing means including weighting means for weighting the spectral component signals.

9. Signal processing apparatus comprising, in combination:

input means for providing an input signal to be processed;

signal generating means for generating a set of signals representative of Walsh functions;

multiplying means connected to said input means and to said signal generating means for multiplying said input signal by each of said signals representative of Walsh functions;

integrating means connected to said multiplying means for integrating the signals from said multiplying means;

squaring means connected to said integrating means for providing output signals indicative of the square of the signals from said integrating means; and output means connected to said squaring means for receiving said output signals.

10. Signal processing apparatus as defined in claim 9 wherein said output means includes a plurality of weighted summing means whereby said output signals are weighted and summed, said summing means classifying said output signals in one of a plurality of classes depending upon the magnitude of the signals resulting from weighting and summing said output signals.

11. Signal processing apparatus as defined in claim 10 wherein each of said summing means includes a set of summing resistors with each set of summing resistors providing one signal, and said output means includes a signal comparator which receives all of the signals from the sets of summing resistors and provides signals indicative of the largest one of the signals from the sets of summing resistors.

12. Signal processing apparatus for classifying an input signal comprising, in combination:

signal generating means for generating a set of orthogonal signals;

input means for providing the input signal to be classified;

means connected to receive said set of orthogonal signals and said input signal for providing a set of spectral signals indicative of the square of the integral of said input signal multiplied by each of the signals in said set of orthogonal signals;

summing means connected to receive said spectral signals and for providing a set of resultant signals, said summing means being weighted so that each of said spectral signals is weighted according to its relative importance in classifying the input signal; and means connected to receive said resultant signals for providing an output indication of which of the resultant signals is largest.

13. Signal processing apparatus as defined in claim 12 wherein the means for providing a set of spectral signals includes a plurality of multiplying means connected to receive the input signal and the set of orthogonal signals;

a plurality of integrating means connected to receive signals from said multiplying means; and a plurality of squaring means connected to receive signals from said integrating means.

14. Signal processing apparatus as defined in claim 13 wherein said summing means includes summing resistors for receiving the spectral signals.

References Cited

UNITED STATES PATENTS

| | | | |
|---|---|---|---|
| 3,172,042 | 3/1965 | Dawirs | 328—48 |
| 3,278,685 | 10/1966 | Harper | 324—77X |
| 3,292,150 | 12/1966 | Wood | 340—149 |
| 3,328,686 | 6/1967 | Fuchs | 235—181X |
| 3,380,023 | 4/1968 | Magnuski | 340—147 |
| 3,416,081 | 12/1968 | Gutleber | 235—181X |

MALCOLM A. MORRISON, Primary Examiner

F. D. GRUBER, Assistant Examiner

U.S. Cl. X.R.

235—183, 193, 197; 307—229; 328—77; 340—147

UNITED STATES PATENT OFFICE

CERTIFICATE OF CORRECTION

Patent No. 3,553,723 Dated January 5, 1971

Inventor(s) Ferdinand R. Ohnsorg

It is certified that error appears in the above-identified patent and that said Letters Patent are hereby corrected as shown below:

Column 1, equation (1) delete "$\emptyset_0^{(t)}$" and substitute --$\emptyset_0(t)$--;

equation (2) delete "$\emptyset_1^{(t)}$" and substitute --$\emptyset_1(t)$--.

Column 7, line 48, delete "$P_i$" and substitute --$P_m$--.

Signed and sealed this 29th day of August 1972.

(SEAL)
Attest:

EDWARD M.FLETCHER,JR.
Attesting Officer

ROBERT GOTTSCHALK
Commissioner of Pater